(12) United States Patent
Heilper et al.

(10) Patent No.: US 7,406,201 B2
(45) Date of Patent: Jul. 29, 2008

(54) CORRECTING SEGMENTATION ERRORS IN OCR

(75) Inventors: Andre Heilper, Haifa (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 10/727,926

(22) Filed: Dec. 4, 2003

(65) Prior Publication Data

US 2005/0123203 A1    Jun. 9, 2005

(51) Int. Cl.
*G06K 9/72* (2006.01)
(52) U.S. Cl. ............ 382/229; 382/159; 382/170; 382/185
(58) Field of Classification Search ........ 382/229, 382/159, 170, 185
See application file for complete search history.

(56) References Cited

U.S. PATENT DOCUMENTS 6,246,794 B1 * 6/2001 Kagehiro et al. ............ 382/185
7,240,062 B2 * 7/2007 Andersen et al. ............ 707/100

\* cited by examiner

*Primary Examiner*—Matthew C. Bella
*Assistant Examiner*—Mike Rahmjoo

(57) ABSTRACT

A method for encoding characters includes identifying one or more sequences of the character codes that are likely to be generated due a segmentation error in application of a pattern recognition process, and associating a respective extension character code with each of the sequences. The area of an image containing characters is divided into segments, such that each segment contains approximately one character. The pattern recognition process is applied to each of the segments in order to generate an input string of character codes. At least one of the identified sequences of the character codes in the input string is replaced with the respective extension character code so as to generate a modified string. The output string is determined by comparing the modified string to a directory of known strings.

4 Claims, 2 Drawing Sheets

CORRECTING SEGMENTATION ERRORS IN OCR

FIELD OF THE INVENTION

The present invention relates generally to methods and systems for optical character recognition (OCR), and specifically to automatic correction of errors that occur in OCR due to incorrect segmentation of characters.

BACKGROUND OF THE INVENTION

OCR is a computerized method for converting printed or handwritten text from a scanned document into corresponding strings of character codes, such as ASCII codes. The OCR process typically includes several stages: First the text on the scanned document is segmented into individual characters. A pattern recognition algorithm is then applied to each character in order to find the likeliest match among the possible character codes. Because these steps are error-prone, they are typically followed by an error-correction step. For example, the computer may look up each OCR-generated word in a dictionary. The computer may automatically correct words that are not found in the dictionary by substituting the nearest match from the dictionary.

Dictionary-based OCR error correction typically uses an approximate string-matching algorithm to find the nearest match. Many of these algorithms are based on the notion of edit distance, as described, for example, by Damerau in "A Technique for Computer Detection and Correction of Spelling Errors," *Communications of the Association for Computing Machinery* 7 (March, 1964), pages 171-176, which is incorporated herein by reference. The distance between two strings is determined by the number of edit operations that are needed to transform one string into another. This distance is commonly referred to as the "Levenshtein distance," based on the work described by Levenshtein in "Binary Codes Capable of Correcting Deletions, Insertions and Reversals," *Soviet Physics Doklady* 8 (1966), pages 707-710, which is incorporated herein by reference.

Wagner and Fischer describe a dynamic-programming approach for efficient computation of edit distance in "The String-to-String Correction Problem," *Journal of the Association for Computing Machinery* 21 (January, 1974), pages 168-173, which is incorporated herein by reference. This approach is widely used in string matching engines. The permitted edit operations for the purpose of edit distance computation include changing one symbol into another single symbol, deleting a symbol from a string, and inserting a symbol into a string. A non-negative cost γ is assigned to each such edit operation, wherein the cost of changing one symbol into another is typically inversely proportional to the likelihood of confusion between the symbols. (For example, in OCR, characters that are similar in appearance, such as O and Q, have a high likelihood of confusion and therefore a low cost.) The edit distance between two strings is given by the sum of the costs of the successive edit operations that are required to transform one string into the other. Since there may be more than one possible trace (defined as a sequence of edit operations) that can transform one string into the other, the minimum cost is taken over all the possible traces between the two strings.

Formally, the distance $D(i,j)$ between strings A and B of respective lengths i and j may be determined using the algorithm defined in Table I below. In accordance with the notation defined by Wagner and Fischer, $A<i>$ is the ith character in A; $|A|$ is the length of A; $\Lambda$ is the null string; and $\gamma(a \to b)$ is the cost of transforming character a into character b.

TABLE I

MINIMUM EDIT DISTANCE COMPUTATION

```
1.    D(0,0) := 0;
2.    for i := 1 to |A| do D(i,0) := D(i–1,0) + γ(A<i>→Λ) ;
3.    for j := 1 to |B| do D(0,j) := D(0,j–1) + γ(Λ→B<j>) ;
4.    for i := 1 to |A| do
5.        for j := 1 to |B| do begin
6.            m₁ := D(i–1,j–1) + γ(A<i>→B<j>);
7.            m₂ := D(i–1,j) + γ(A<i>→Λ);
8.            m₃ := D(i,j–1) + γ(Λ→B<j>);
9.            D(i,j) := min(m₁, m₂, m₃);
10.       end
```

The method described by Wagner and Fischer determines edit distance in terms of single-character errors, i.e., substitution of one character for another or insertion or deletion of a single character. In OCR, however, dual-character errors are common due, for example, to incorrect segmentation. Thus, for example, the handwritten character "m" may be split into "r" and "n", or "B" may be split into "1" and "3". Other errors of this sort are well known in the art. To correct such an error using a single-character error model involves two editing steps: a substitution and a deletion. As a consequence, the computed edit cost of transforming the incorrectly-split characters (r and n, for example) back into the correct original character (m) will be high, and the computer may be unsuccessful in correcting this OCR error.

Seni et al. propose a solution to this problem in "Generalizing Edit Distance to Incorporate Domain Information: Handwritten Text Recognition as a Case Study," *Pattern Recognition* 29 (1996), pages 405-414, which is incorporated herein by reference. They extend the basic dynamic-programming method for computing string differences to allow for merges, splits and pair substitutions (wherein one pair of letters is substituted for another pair due to incorrect segmentation). The extension is achieved by adding three new operations in the distance computation shown in Table I, corresponding to the incremental cost of a merge, split or pair substitution at each iteration. Implementing this approach requires modifications to string matching engines that are based on the algorithm of Wagner and Fischer, as well as development of a rationale for decisions about the relative costs to associate with the new operations:

SUMMARY OF THE INVENTION

Embodiments of the present invention provide efficient methods and systems for correcting segmentation errors in pattern recognition processes such as OCR. These methods are based on adding novel extension characters, with corresponding character codes, to the set of character codes generated by OCR. Each extension character corresponds to a sequence of character codes (such as the codes for "rn" or "13", as noted above) that may occur in an input string generated by OCR due to incorrect segmentation. When such sequences of character codes occur in the pattern recognition stage, each sequence is replaced by the corresponding extension character code, in order to generate a modified string for purposes of string matching in the error correction stage. A directory of correct words for use in string matching is likewise modified to include entries containing the extension characters.

The extended character set and modified directory can be used with existing string matching engines, substantially without modification to the engine. The extension characters may be assigned character codes in the existing code set that is used by an unmodified OCR system, such as unused ASCII codes. Since the extension characters are treated as individual single characters, the same single-character edit operations are applied to the extension characters in the modified string as to the conventional alphanumeric characters. No new edit operations need be defined, unlike the method proposed by Seni et al.

Although the embodiments described herein relate specifically to OCR functions, the principles of the present invention may be applied in other areas involving segmentation and pattern recognition, such as DNA sequencing.

There is therefore provided, in accordance with an embodiment of the present invention, a method for encoding characters appearing in an area of an image in order to generate a corresponding output string of character codes, the method including:

identifying one or more sequences of the character codes that are likely to be generated due a segmentation error in application of a pattern recognition process, and associating a respective extension character code with each of the sequences;

dividing the area of the image into segments such that each segment contains approximately one character;

applying the pattern recognition process to each of the segments in order to generate an input string of character codes, the input string including a respective character code for each of the segments;

locating at least one of the sequences of the character codes in the input string, and replacing the at least one of the sequences with the respective extension character code so as to generate a modified string; and determining the output string by comparing the modified string to a directory of known strings.

In a disclosed embodiment, the character codes that are generated by the pattern recognition process are selected from a predetermined set of eight-bit codes, and associating the respective extension character code includes assigning a respective eight-bit code that is not included in the predetermined set to replace each of the sequences. Typically, applying the pattern recognition process includes applying optical character recognition (OCR).

In some embodiments, determining the output string includes finding an approximate match between the modified string and one of the known strings, and outputting the one of the known strings. Typically, finding the approximate match includes computing respective edit distances between the modified string and a plurality of the known strings, and selecting the one of the known strings responsively to the respective edit distances. Computing the respective edit distances may include determining respective costs of edit operations involving the extension character code, and applying the respective costs in computing the respective edit distances. Typically, each of the one or more sequences of the character codes is generated due to incorrect segmentation of a respective original character having a respective original character code, and determining the respective costs includes assigning a cost of zero to a transformation of the respective extension character code associated with each of the sequences to the respective original character code.

Additionally or alternatively, finding the approximate match includes replacing each of the one or more sequences of the character codes in the known strings with the respective extension character code so as to create aliases that are respectively derived from the known strings, adding the aliases to the directory, and finding the approximate match between the modified string and one of the aliases, wherein outputting the one of the known strings includes outputting the one of the known strings from which the one of the aliases is respectively derived.

There is also provided, in accordance with an embodiment of the present invention, apparatus for encoding characters appearing in an area of an image in order to generate a corresponding output string of character codes, the apparatus including:

a memory, which is arranged to hold a directory of known strings; and at least one processor, which is arranged to receive an identification of one or more sequences of the character codes that are likely to be generated due a segmentation error in application of a pattern recognition process, and to associate a respective extension character code with each of the sequences, and which is further arranged to divide the area of the image into segments such that each segment contains approximately one character, to apply the pattern recognition process to each of the segments in order to generate an input string of character codes, the input string including a respective character code for each of the segments, to locate at least one of the sequences of the character codes in the input string, and to replace the at least one of the sequences with the respective extension character code so as to generate a modified string, and to determine the output string by comparing the modified string to the known strings in the directory.

There is additionally provided, in accordance with an embodiment of the present invention, a computer software product for encoding characters appearing in an area of an image to generate a corresponding output string of character codes, the product including a computer-readable medium in which program instructions are stored, which instructions, when read by a computer, cause the computer to receive an identification of one or more sequences of the character codes that are likely to be generated due a segmentation error in application of a pattern recognition process, and to associate a respective extension character code with each of the sequences, and further cause the computer to divide the area of the image into segments such that each segment contains approximately one character, to apply the pattern recognition process to each of the segments in order to generate an input string of character codes, the input string including a respective character code for each of the segments, to locate at least one of the sequences of the character codes in the input string, and to replace the at least one of the sequences with the respective extension character code so as to generate a modified string, and to determine the output string by comparing the modified string to a directory of known strings.

The present invention will be more fully understood from the following detailed description of the embodiments thereof, taken together with the drawings in which:

DETAILED DESCRIPTION OF EMBODIMENTS

Figure 1:
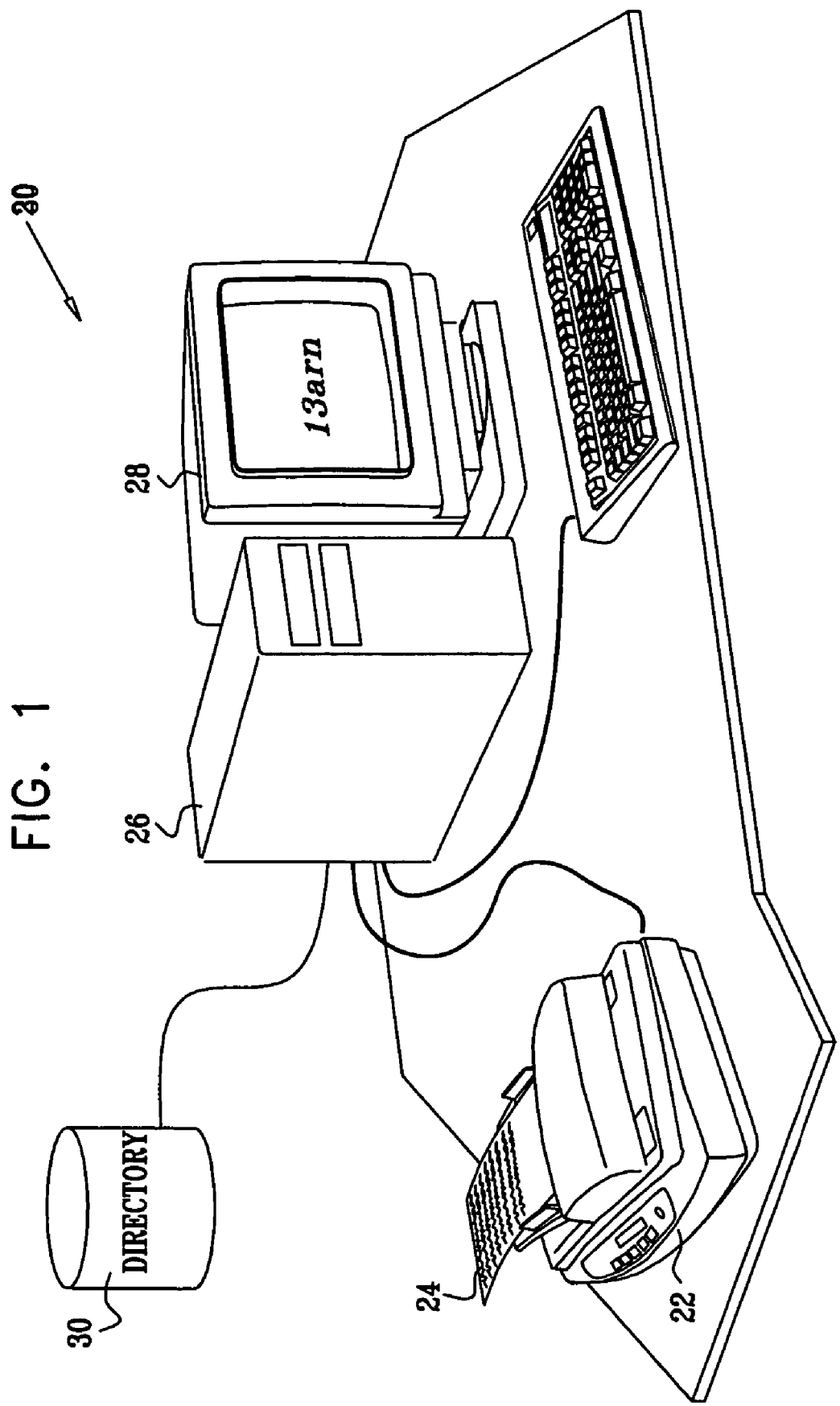
FIG. 1 is a schematic, pictorial illustration of a system for OCR, in accordance with an embodiment of the present invention.

FIG. 1 is a schematic, pictorial illustration of a system 20 for OCR, in accordance with an embodiment of the present invention. An input device 22, such as a scanner, captures an image of a document 24 on which characters are written or printed. A processor, typically a computer 26, processes the image, using methods of pattern recognition known in the art, in order to identify the characters and assign them the proper character codes. Computer 26 then applies a string matching algorithm to correct OCR errors, as described hereinbelow, and outputs the OCR results to an output device, such as a display monitor 28, or stores the results in memory for further processing.

In order to identify and correct OCR errors, computer 26 checks the strings of character codes that it has generated in the pattern recognition stage against a directory 30 of known words, which is held in a memory. Alternatively, the pattern recognition and error correction functions may be performed by separate computers. In either case, in the error correction stage the computer typically applies an approximate string matching algorithm to a modified string, in which certain sequences of character codes are replaced by corresponding extension character codes in both the pattern recognition output of computer 26 and in directory 30. The use of the extension character codes permits the computer to correct segmentation errors simply and accurately, as described further hereinbelow. Computer 26 typically performs these error correction functions under the control of software, which may be downloaded to the computer in electronic form, over a network, for example, or may alternatively be provided on tangible media, such as CD-ROM.

Figure 2:
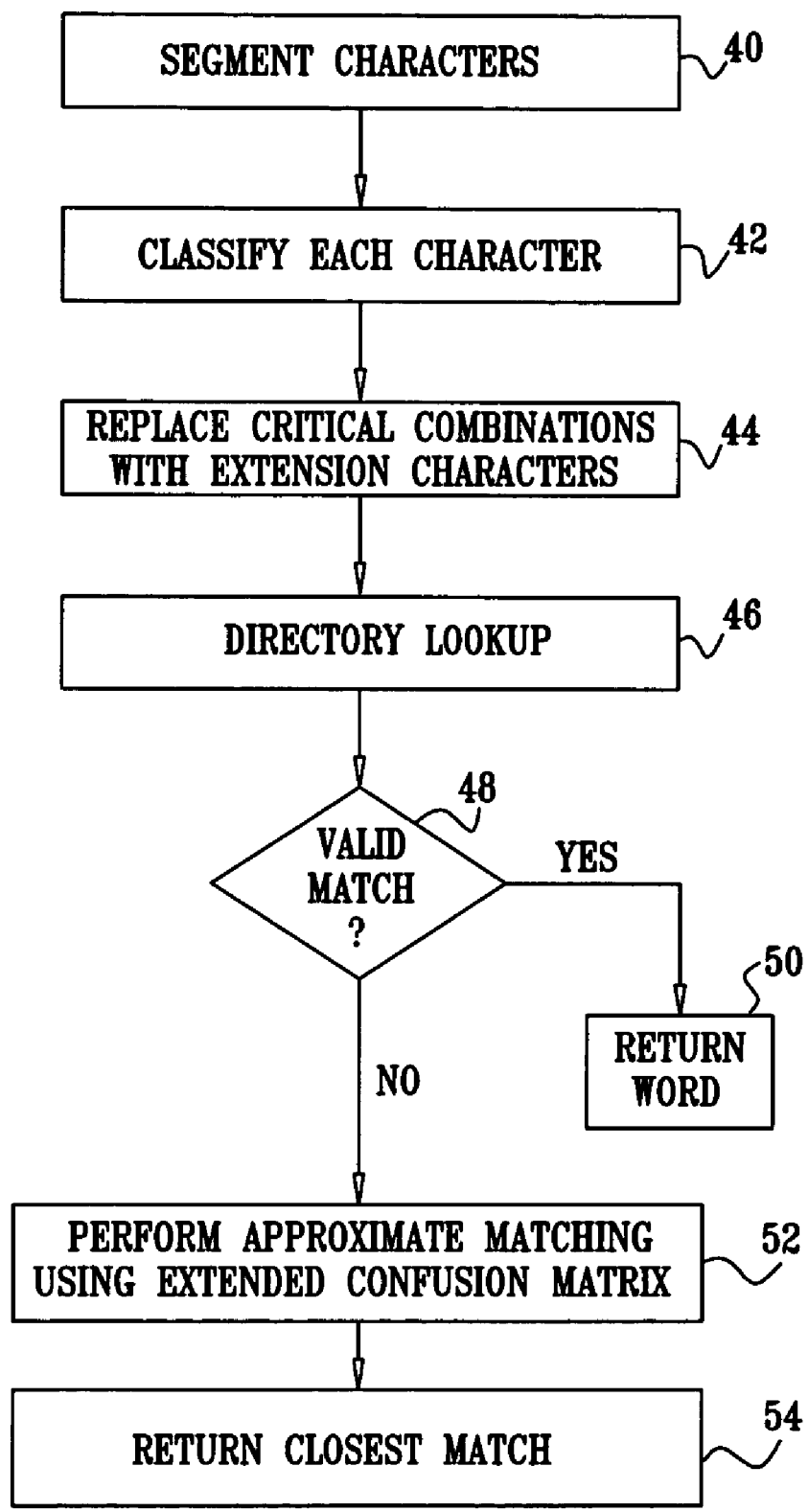
FIG. 2 is a flow chart that schematically illustrates a method for OCR with correction of segmentation errors, in accordance with an embodiment of the present invention.

FIG. 2 is a flow chart that schematically illustrates a method for OCR that is implemented in system 20, in accordance with an embodiment of the present invention. Upon receiving the image of document 24, computer 26 first segments the image in order to identify the individual characters, at a segmentation step 40. This step commonly involves determining the layout of the document, identifying lines of text and segmenting the lines into words and characters. Various segmentation algorithms, as are known in the art, may be used at this stage. Such algorithms are aimed at dividing the text area of the image into segments such that each segment contains a single character. Errors in the segmentation algorithm, however, almost inevitably result in some characters being split into multiple segments, or in multiple characters being combined into a single segment. Therefore, it can be said that the result of segmentation step 40 is that each segment contains approximately one character.

Computer 26 next applies pattern recognition to assign a character code, such as an ASCII code, to each character, at a classification step 42. Any suitable OCR engine known in the art may be used for this purpose. The OCR engine generates an input string of character codes corresponding to each word in the image, with one character code for each segment.

Before proceeding to compare the strings of character codes generated by OCR at step 42 to the words in directory 30, computer 26 replaces certain critical combinations of character codes with predetermined extension character codes, at a preprocessing step 44. "Critical combinations" in this context are sequences of two or more character codes in the OCR output that are known to result frequently from improper segmentation of some other character, such as "rn" resulting from "m", or "13" resulting from "B", or "cl" resulting from "d". Other critical combinations will be apparent to those skilled in the art. Although for the sake of simplicity, only two-character critical combinations are considered here, the methods of the present invention are also applicable when an original character may be incorrectly segmented into three characters. Sequences of characters that are subject to pair substitution, as described by Seni et al., may also be treated as critical combinations.

The "extension characters" have character codes that are not used in the ordinary OCR output. For example, when the ASCII code set is used, conventional OCR engines are typically not programmed to use all of the possible 256 character codes in the input strings that they generate. The codes corresponding to the Greek letters $\alpha$, $\beta$, etc., may be unused in the OCR output. In this case, at step 44, occurrences of "rn" in the OCR-generated string may be replaced by the code for "$\alpha$", "13" may be replaced by the code for "$\beta$", and so forth. The word "barn" in the OCR output would thus be replaced at this step with the modified string "ba$\alpha$". Alternatively or additionally, new character codes may be added to represent the extension characters, beyond the basic 256 codes in the conventional code set.

Directory 30 is also extended to include aliases corresponding to valid words that contain critical combinations of characters. For example, "ba$\alpha$" would be added to the directory as an alias for "barn". A word containing multiple critical combinations will have multiple aliases in the extended directory. Typically, for a word containing q critical combinations, the directory will include $2^q$ entries.

After substituting extension characters into the OCR-generated words, computer 26 looks up each modified string in directory 30, at a lookup step 46. If an exact match is found for a given string, error detection may terminate, at a matching step 48. In this case, the computer outputs the matching word, at an exact match output step 50. Any extension character in the matching word is converted back into the actual characters that the extension character represents. Thus, "$\alpha$" would be converted back into "rn", and so forth. Alternatively, steps 48 and 50 may be omitted, and all OCR-generated strings may be subjected to approximate matching against directory 30, as described below.

Computer 26 uses an approximate string matching technique to find the closest word in directory 30 for each modified string, at an approximate matching step 52. The best match is typically found on the basis of an edit distance computation. Any suitable method known in the art may be used for this purpose, such as the method of Wagner and Fischer that is described in the Background of the Invention. Existing string matching engines may be used at this step with only minor modifications, or with no modification at all as long as the character codes of the extension characters have the same sort of binary representation (for example, as eight-bit binary numbers) as do the ordinary character codes generated by the OCR engine.

To compute the edit distances according to the method of Wagner and Fischer, it is necessary to assign a cost $\gamma$ to each edit operation. String matching engines known in the art typically use a "confusion matrix" C for this purpose. C has one row for each possible input character a in the OCR-generated string, and one column for each possible output character b in the string found in directory 30. C also includes a row and a column for the null character $\Lambda$. Each entry in C represents the cost $\gamma$ of transforming a into b, including deletions (a→$\Lambda$) and insertions ($\Lambda$→b). C is not necessarily symmetrical. The entries in C may be derived, for example, on the basis of statistical analysis of differences between raw OCR results (without error correction) on a corpus of sample text and human-generated transcription of the same text. Frequent substitutions of one character for another in the OCR results will generally lead to a small cost $\gamma$ in the corresponding entry in C, and vice versa.

In an embodiment of the present invention, C is extended to give an extended confusion matrix C', with additional rows and columns corresponding to the extension characters. The following rules generally apply to these added rows and columns:

The cost of transforming an extension character into the non-segmented character from which it may have been erroneously derived is generally zero. In other words, taking α as the extension character for "rn", γ(α→m)=0. This means that the edit distance from an OCR output of "barn" to an entry "barn" in directory 30 will be effectively zero. The reverse transformation, such as (m→α), may likewise have zero or low cost, to facilitate correction of segmentation errors caused by conjoining multiple characters into one. Segmentation errors that occur only infrequently, however, may have a non-zero cost.

The cost of transforming an extension character into a normal character is typically the sum of costs of two edit operations (substitution and deletion). Transforming an extension character into a similar pair of normal characters (such as α(rn)→rh), can be treated, when necessary, as a transformation of one extension character into another, as described below.

The cost of transforming a normal character into an extension character reflects the cost of a single edit operation. Clearly, the entries in the confusion matrix will provide a low cost for transformation of one of the constituent normal characters of an extension character into the extension character itself, such as r→α(rn), and will provide higher costs for other transformations.

The cost of transforming one extension character into another is the cost of a single edit operation (with sufficiently high costs assigned to unlikely transformations, such as α(rn)→β(13)).

Thus, at step 52, the edit distances between the modified OCR string, with extension characters added at step 44, and the words listed in extended directory 30 are computed using the costs given by the extended confusion matrix C'. The word in directory 30 that is found to have the shortest edit distance from the modified OCR string is selected as the correct reading of the string, at a matching step 54. When the selected word is an alias, containing one or more extension characters, these extension characters are replaced by the corresponding normal characters. For example, if "baα" is the closest match, computer 28 replaces the α with "rn" and outputs the word "barn".

Although the method of FIG. 2 makes use of the dynamic-programming approach of Wagner and Fischer in computing edit distances at step 52, the principles of the present invention—particularly the use of extension characters as described hereinabove—may similarly be applied using other methods of string matching known in the art. These principles are applicable not only in correcting OCR errors, but also in other fields in which sequences of known elements, such as DNA sequences, must be analyzed and identified. Therefore, the terms "character" and "string" as used herein should be understood to comprise not only alphanumeric characters and strings of such characters, but also other predefined elements and sequences of such elements that are given to computerized analysis.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, implemented by a computer, for encoding characters appearing in an area of an image in order to generate a corresponding output string of character codes, the method comprising the following steps, carried out by the computer:

identifying one or more sequences of the character codes that are known to result frequently due a segmentation error in application of a pattern recognition process, and associating a respective extension character code with each of the sequences, wherein each of the one or more sequences of the character codes is generated due to incorrect segmentation of a respective original character having a respective original character code;

dividing the area of the image into segments such that each segment contains approximately one character;

applying the pattern recognition process to each of the segments in order to generate an input string of character codes, the input string comprising a respective character code for each of the segments;

locating at least one of the sequences of the character codes in the input string, and replacing the at least one of the sequences with the respective extension character code so as to generate a modified string; and determining the output string by finding an approximate match between the modified string and a known string in a directory of known strings by computing respective edit distances between the modified string and a plurality of the known strings based on respective costs of edit operations involving the extension character code, and selecting the one of the known strings responsively to the respective edit distances, wherein a cost of zero is assigned to a transformation of the respective extension character code associated with each of the sequences to the respective original character code.

2. The method according to claim 1, wherein the character codes that are generated by the pattern recognition process are selected from a predetermined set of eight-bit codes, and wherein associating the respective extension character code comprises assigning a respective eight-bit code that is not included in the predetermined set to replace each of the sequences.

3. The method according to claim 1, wherein applying the pattern recognition process comprises applying optical character recognition (OCR)

4. The method according to claim 1, wherein finding the approximate match comprises:

replacing each of the one or more sequences of the character codes in the known strings with the respective extension character code so as to create aliases that are respectively derived from the known strings;

adding the aliases to the directory; and finding the approximate match between the modified string and one of the aliases, and wherein outputting the one of the known strings comprises outputting the one of the known strings from which the one of the aliases is respectively derived.

* * * * *